US005938821A

United States Patent [19]

Rule et al.

[11] Patent Number: 5,938,821

[45] Date of Patent: Aug. 17, 1999

[54] DRUM BUBBLER TRITIUM PROCESSING SYSTEM

[75] Inventors: Keith Rule, Hopewell, N.J.; Geoff Gettelfinger, Lexington, Mass.; Paul Kivler, Hamilton Square, N.J.

[73] Assignee: The United States of America as represented by the United States Department of Energy, Washington, D.C.

[21] Appl. No.: 09/018,956

[22] Filed: Feb. 5, 1998

[51] Int. Cl.[6] .................................................... B01D 47/02

[52] U.S. Cl. ................................................ 95/226; 96/351

[58] Field of Search ................................ 95/226; 96/329, 96/340, 342, 351

[56] References Cited

U.S. PATENT DOCUMENTS

| | | | |
|---|---|---|---|
| 3,404,067 | 10/1968 | Rendos | 95/226 |
| 3,944,466 | 3/1976 | Marchese | 176/37 |
| 4,019,867 | 4/1977 | Fabian | 23/260 |
| 4,816,209 | 3/1989 | Schweiger | 96/351 |
| 5,505,829 | 4/1996 | Villa-Aleman | 96/108 |

FOREIGN PATENT DOCUMENTS

| | | | |
|---|---|---|---|
| 79/00025 | 1/1979 | WIPO | 95/226 |

*Primary Examiner*—Duane S. Smith
*Attorney, Agent, or Firm*—Bradley W. Smith; Mark P. Dvorscak; William R. Moser

[57] ABSTRACT

A method of separating tritium oxide from a gas stream containing tritium oxide. The gas stream containing tritium oxide is fed into a container of water having a head space above the water. Bubbling the gas stream containing tritium oxide through the container of water and removing gas from the container head space above the water. Thereafter, the gas from the head space is dried to remove water vapor from the gas, and the water vapor is recycled to the container of water.

32 Claims, 2 Drawing Sheets

DRUM BUBBLER TRITIUM PROCESSING SYSTEM

CONTRACTUAL ORIGIN OF THE INVENTION

The United States Government has rights in this invention pursuant to Contract No. W-31-109-ENG-38 between the U.S. Department of Energy and The University of Chicago representing Argonne National Laboratory.

BACKGROUND OF THE INVENTION

This invention relates to the absorption, storage and disposal of tritium oxide. More particularly, this invention relates to a tritium oxide absorption in a water media which is more efficient than commonly used molecular sieves. The subject process is particularly advantageous when the process gas has a high moisture content, on order of >50% relative humidity. The currently used molecular sieves are approximately 23% efficient for water absorption, that is absorption of tritium oxide in the form of water when the curie amount of tritium is loaded onto a type A quantity container of about 1,000 curies. The subject invention permits the same amount of radioactivity to be absorbed in a 55 gallon drum more efficiently and which can be disposed of using current technology.

The invention comprises a system and method utilizing a 55 gallon drum containing water with an internal configuration which provides for the aeration of the tritium and the absorption of the tritium by the water media. The aeration process is effective for removing tritium in the oxide form, from a gas process stream containing tritium oxide. A separate free-standing support system provides the motive force for the flow of gas through the drum apparatus using a vacuum pump. The free-standing system also contains a refrigeration unit to condensate the moisture from the drum exhaust-gas stream and return the condensate moisture as liquid to the drum. The result of this system is a dry air exhaust containing less than 10% of the original tritium oxide, resulting in the system which is 90% effective in removing tritium oxide from a gas process stream. In another iteration of the invention, the dried gas can be recirculated to the system for additional treatment.

SUMMARY OF THE INVENTION

Accordingly, it is an object of the invention to provide a method and system for separating tritium gas from a gas stream containing tritium oxide which is at least 90% effective in removing the tritium from the process gas stream.

Yet another object of the invention is to provide a method of separating tritium oxide from a gas stream containing tritium oxide, comprising introducing the gas stream containing tritium oxide into a container of water having a head space above the water, bubbling the gas stream containing tritium oxide through the container of water, removing gas from the container head space above the water, drying the gas from the head space to remove water vapor from the gas, and recycling the water vapor to the container of water.

Still another object of the invention is to provide a method of separating tritium oxide from a gas stream containing tritium oxide, comprising introducing the gas stream containing tritium oxide into a container of water having a head space above the water, providing a vacuum in communication with the head space in the container, introducing the gas stream containing tritium oxide near the bottom of the container of water to cause bubbles to form in the water and migrate towards the head space, removing gas from the container head space above the water, drying the gas from the head space to remove water vapor from the gas and recycling the water vapor to the container of water.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF THE PREFERRED EMBODIMENT

Figure 1:
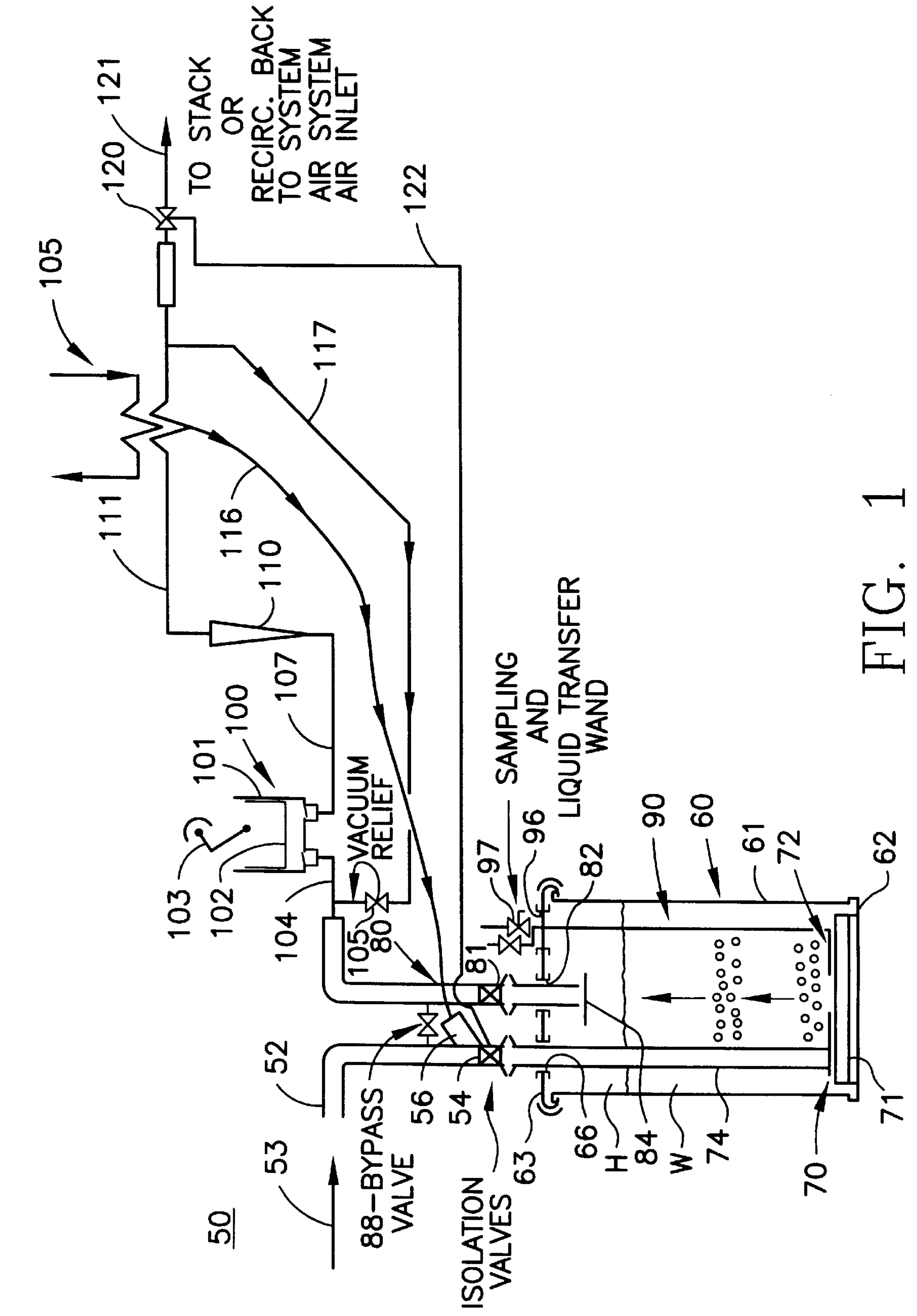
FIG. 1 is a schematic view of a system for practicing the method of the method.
Figure 2:
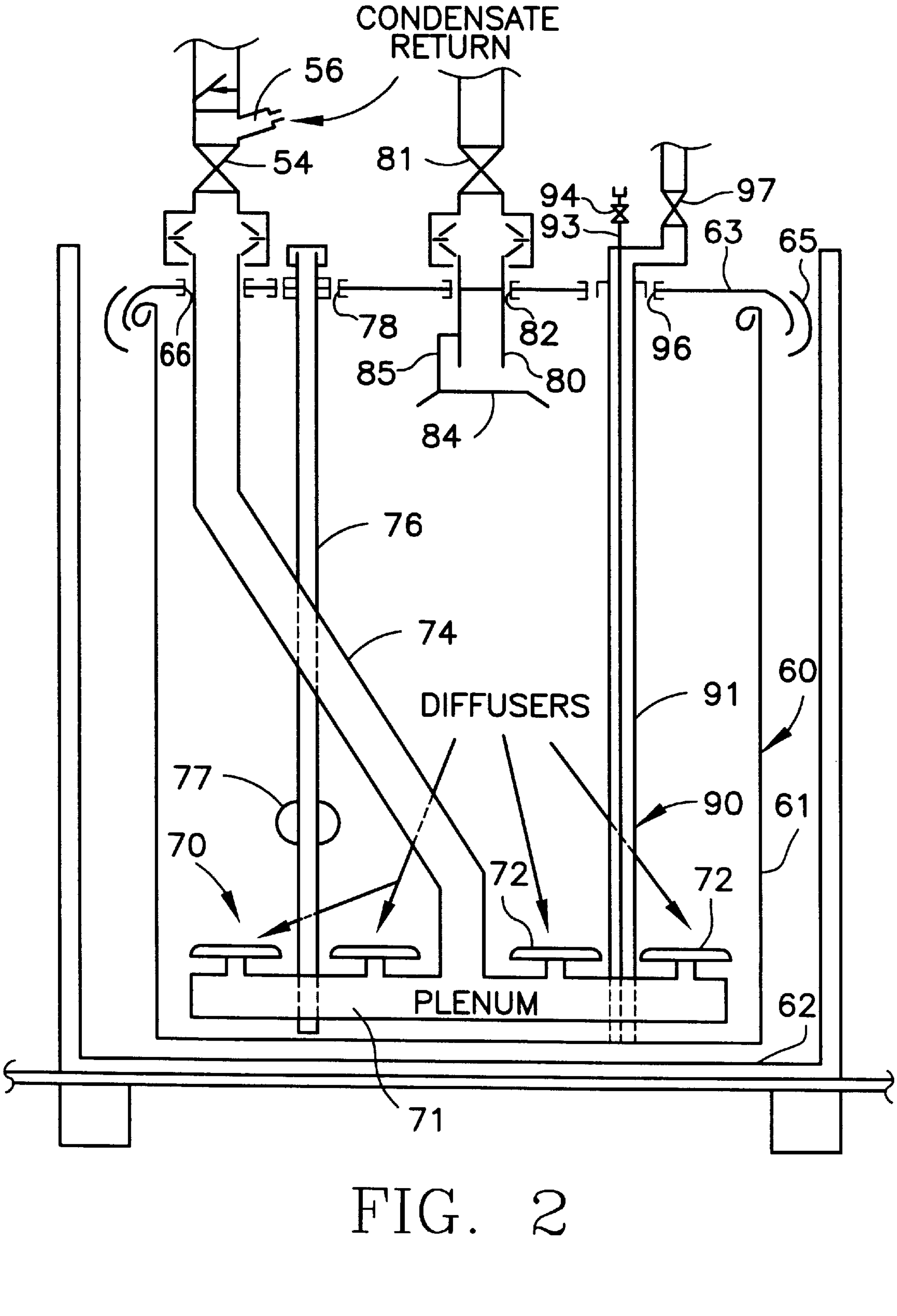
FIG. 2 is an enlarged version of the schematic illustration of the container forming a water media for absorbing the tritium oxide.

Referring now to FIGS. 1 and 2 of the drawings, there is disclosed a system 50 for treating product stream containing tritium oxide which includes an air inlet 52 connected to a source of tritium oxide 53. An inlet valve 54 is positioned in the inlet 52. Above the inlet valve 54 and the line 52 is a condensate return fitting 56, for a purpose hereinafter set forth.

A drum 60, preferably a 55 gallon drum contains a side wall 61, bottom 62 and a perforated top 63. The top 63 is sealed to the side wall 61 by mechanism 65 which provides an air tight seal between the top 63 and the drum side wall 61. A bushing 66 is provided in the top 63 for a purpose hereinafter set forth.

A distributor mechanism 70 is schematically shown in FIG. 1 and shown in more detail in FIG. 2 and is positioned at the bottom of the container 60 near the bottom wall or bottom surface 62 thereof. The distributor 70 is in the form of a plenum 71 having a plurality of apertures or bubblers or diffusers 72 spaced along the plenum 71, it being understood that the plenum 71 may be generally circular in shape with the plurality of diffusers or bubblers 72 throughout. A conduit 74 provides communication between the plenum 71 and the valve 54 connected to the inlet conduit 52, thereby to provide a flow path from the source of tritium oxide 53 to the inside of the container 60 near the bottom surface or wall 62 thereof.

A rod 76, as shown in FIG. 2, extends through a bushing 78 in the top 63 of the container 60 and is provided with a slidable float or film of magnetic material 77 which when used in conjunction with a magnetic detecting device outside the container 60 permits the level of water in the container 60 to be determined on a continuous basis. Equipment for sensing and recording the level of a liquid in a container is well known and not shown herein.

Exit conduit 80 extends outwardly from the top 63 of the container 60 through a bushing 82 thereof and has an outlet valve 81 in the conduit. The end of the conduit 80 is somewhat spaced from and above a splash baffle 84 which as shown in FIG. 2 has a mounting bracket 85 attached thereto and fixed in the container 60 either to the top 63 or to a side wall 61 thereof, as desired. A bypass valve 88 is shown in FIG. 1 connecting the inlet conduit 52 and the outlet conduit 80 so as to bypass the container 60 during maintenance and other times when tritium is not flowing within the system.

Referring to FIGS. 1 and 2, there is a liquid sampling and transfer wand mechanism 90 which includes a conduit 91 extending through the top 63 of the container 60. A needle device 93 extends through the center of the hollow conduit 91 and is connected to a sampling valve 94. A bushing 96 seals the container 60 at the insertion point of the conduit 91 and the conduit is connected via a liquid transfer valve 97 to remote sampling apparatus, not shown.

A vacuum pump 100 is in communication with the outlet or exit conduit 80. More particularly, the vacuum pump 100 shown schematically in FIG. 1 includes a housing or casing 101, a piston 102 and a crank or other motor mechanism 103. The vacuum pump 100 is connected by one line 104 to the exit or outlet conduit 80, and hence, to the head space above the level of liquid in the container 60 and at the other end of the vacuum pump 100 is connected via a line 107 to a variable area flow meter 110 having a throttle mechanism which is connected via a line 111 to a refrigeration unit 115. The refrigeration unit 115 is a heat exchanger which is connected to a source of coolant so as to reduce the temperature of the gas in the line 111 to cause water to condense from the gas after the temperature thereof has been reduced. The condensation from the gas in line 111 is returned via a line 106 to the condensate return fitting 56 above the valve 54 for reintroduction into the container 60. A line 117 serves to connect the line 111 after the refrigeration unit 115 to the vacuum release valve 105 positioned between the line 104 inlet to the vacuum pump 100 and the line 111 after the refrigeration unit.

Finally, a valve 120 in the line 111 after the refrigeration unit serves to either pass all of the gas through line 121 to a stack or exhaust to the atmosphere or to recycle part or all of the gas after the refrigeration unit 115 through line 122 back to the valve 54 for reintroduction into the container 60. In this manner, the valve 120 permits the entire system 50 to be a recirculating system in which no gas is vented to the atmosphere or to vent gas to the atmosphere after sufficient quantities of tritium are removed, monitoring equipment (not shown) may be in communication with any one of the lines previously discussed and more particularly maybe in communication with line 121 to ascertain the amount of tritium, if any, vented to the atmosphere.

As seen, therefore, a product gas containing tritium from a source 53 thereof is introduced into the container 60 via the conduit 52 where it is diffused through the diffuser 72 connected to the plenum 71 so that bubbles are formed at the plenum 71 and move upwardly through the water "W" in the container 60 to the head space "H" above the water level in the container 60 whereupon the product gas less the amount of tritium absorbed in the water "W" in the container 60 is exhausted from the container via the exit or outlet conduit 80 due to the vacuum pump 100 and is thereafter cooled in the refrigeration unit 115 to dry the air or product stream with the condensate being returned by a line 116 to the container 60.

As is well known, bubbles formed at the bottom of a pressure head expand in diameter as they move upwardly. It is preferred that in a 55 gallon drum container 60 there will be approximately 40–45 gallons of water "W" in the container. The bubble size is preferably in the range of from about 10 to about 20 microns average diameter at the plenum 71, it being understood that the bubble diameters increase as the bubbles rise to the top of the water "W" and into the headspace "H" above the water level in the container 60. It is understood that the greater the number of, and the smaller the bubble diameter, the greater the surface area of the bubbles in contact with the water "W", thereby promoting transfer of tritium in the product gas to the water "W" in the container 60.

The water "W" is preferably maintained at a temperature in the range of from about 60° F. to about 80° F. If the water temperature is too low, then there is less transfer of tritium into the water and if the water temperature is too high, then the amount of tritium maintained in the water is reduced as the water would boil off into the headspace "H". The maximum vacuum drawn on the container 30 should be about 15 inches of mercury. Higher vacuum runs the risk of collapsing the container 60. The vacuum drawn on the container 60 may be in the range of from about 10 to about 15 inches of mercury. However, the system 50 preferably is operated at vacuum levels of between about 10 to about 12 inches of mercury which also controls the flow rate of bubbles through the water "W" in the container 60. It is also understood that the amount of water in the container 60 contributes to the residence time of the bubbles in the container.

After sufficient tritium is absorbed into the water medium "W", a cross-linking polymer is used to convert the water containing the tritium into a gel like substance. Well known solidifying agents are available and the preferred solidifying agent is produced by Corpex Technologies located at Research Triangle Park in North Carolina and sold under the trademark designation STERGO®.

In general, the flow rate of product gas into the container 60 should be greater than 2.5 cubic feet per minute with a maximum of about 5 cubic feet per minute. The 55 gallon drum preferably may contain 4 ceramic dome shaped diffusers 72 which have a total of 180 square inch of surface area. The conduits used in the drum or container 60 may be a variety of materials but PVC plastic is acceptable. After the tritium is absorbed in the water "W", and the STERGO® absorption product is introduced into the drum, the drum can be disposed of in accepted disposal sites for radioactive solids.

While there has been disclosed what is considered to be the preferred embodiment of the present invention, it is understood that various changes in the details may be made without departing from the spirit, or sacrificing any of the advantages of the present invention.

The embodiments of the invention in which an exclusive property or privilege is claimed are defined as follows:

1. A method of separating tritium oxide from a gas stream containing tritium oxide, comprising introducing the gas stream containing tritium oxide into a container of water having a head space above the water, bubbling the gas stream containing tritium oxide through the container of water, removing gas from the container head space above the water, drying the gas from the head space to remove water vapor from the gas, recycling the water vapor to the container of water and introducing the gas containing the tritium oxide into water having a temperature in the range of from about 60° F. to about 80° F.

2. The method of claim 1, wherein the average bubble diameter at the bottom of the container is in the range of from about 10 to about 20 microns.

3. The method of claim 1, wherein the dried gas is vented to the atmosphere and has a relative humidity of not more than about 1% at ambient temperature.

4. The method of claim 1, wherein the dried gas is recycled.

5. The method of claim 1, wherein the dried gas is vented to the atmosphere.

6. The method of claim 1, wherein a portion of the dried gas is recycled and a portion of the dried gas is vented to the atmosphere.

7. The method of claim 1, and further comprising continuously measuring the liquid level in the container.

8. The method of claim 1, wherein a source of vacuum is in communication with the head space to remove gas for drying.

9. The method of claim 1, and further comprising converting the tritium containing water in the container to a gel by contact with an absorption media.

10. The method of claim 1, wherein the recycled water vapor is mixed with the gas stream containing tritium oxide.

11. The method of claim 10, wherein the tritium oxide containing gas is introduced into the container at a flow rate in the range of from about 2.5 $ft^3$/min to about 5.0 $ft^3$/min.

12. The method of claim 1, wherein the container is a fifty-five gallon drum containing from about 40 gallons to about 45 gallons of water.

13. A method of separating tritium oxide from a gas stream containing tritium oxide, comprising introducing the gas stream containing tritium oxide into a container of water having a temperature in the range of from about 60° F. to about 80° F. and having a head space above the water, providing a vacuum in communication with the head space in the container, introducing the gas stream containing tritium oxide near the bottom of the container of water to cause bubbles to form in the water and migrate towards the head space, removing gas from the container head space above the water, drying the gas from the head space to remove water vapor from the gas and recycling the water vapor to the container of water.

14. The method of claim 13, wherein the dried gas is recycled to the gas stream containing tritium oxide.

15. The method of claim 14, wherein a portion of the dried gas is vented to the atmosphere.

16. The method of claim 14, wherein the vacuum in communication with the head space does not exceed about 15 inches of Hg.

17. The method of claim 16, wherein the average bubble diameter at the bottom of the container is in the range of from about 10 to about 20 microns.

18. The method of claim 17, wherein the tritium oxide containing gas is introduced into the container at a flow rate in the range of from about 2.5 $ft^3$/min to about 5.0 $ft^3$/min.

19. The method of claim 18, wherein the container is a fifty-five gallon drum containing from about 40 gallons of water to about 45 gallons of water.

20. A method of separating tritium oxide from a gas stream containing tritium oxide, comprising introducing the gas stream containing tritium oxide into a container of water as small bubbles by means of a diffuser, having a head space above the water, flowing the gas stream containing tritium oxide through the water, removing gas from the container head space above the water, drying the gas from the head space to remove water vapor from the gas, recycling the water vapor to the container of water, and maintaining a water temperature below the temperature at which the water would boil.

21. The method of claim 20, wherein the average bubble diameter at the bottom of the container is in the range of from about 10 to about 20 microns.

22. The method of claim 20, wherein the dried gas is vented to the atmosphere and has a relative humidity of not more than about 1% at ambient temperature.

23. The method of claim 20 wherein the dried gas is recycled.

24. The method of claim 20, wherein the dried gas is vented to the atmosphere.

25. The method of claim 20, wherein a portion of the dried gas is recycled and a portion of the dried gas is vented to the atmosphere.

26. The method of claim 20, and further comprising continuously measuring the liquid level in the container.

27. The method of claim 20, wherein a source of vacuum is in communication with the head space to remove gas for drying.

28. The method of claim 20, and further comprising converting the tritium containing water in the container to a gel by contact with an adsorption media.

29. The method of claim 20, wherein the recycled water vapor is mixed with the gas stream containing tritium oxide.

30. The method of claim 29, wherein the tritium oxide containing gas is introduced into the container at a flow rate in the range of from about 2.5 $ft^3$/min to about 5.0 $ft^3$/min.

31. The method of claim 20, wherein the container is a fifty-five gallon drum containing from about 40 gallons to about 45 gallons of water.

32. The method of claim 20, wherein the gas containing the tritium oxide is introduced into water having a temperature in the range of from about 60° F. to about 80° F.

* * * * *